UNITED STATES PATENT OFFICE.

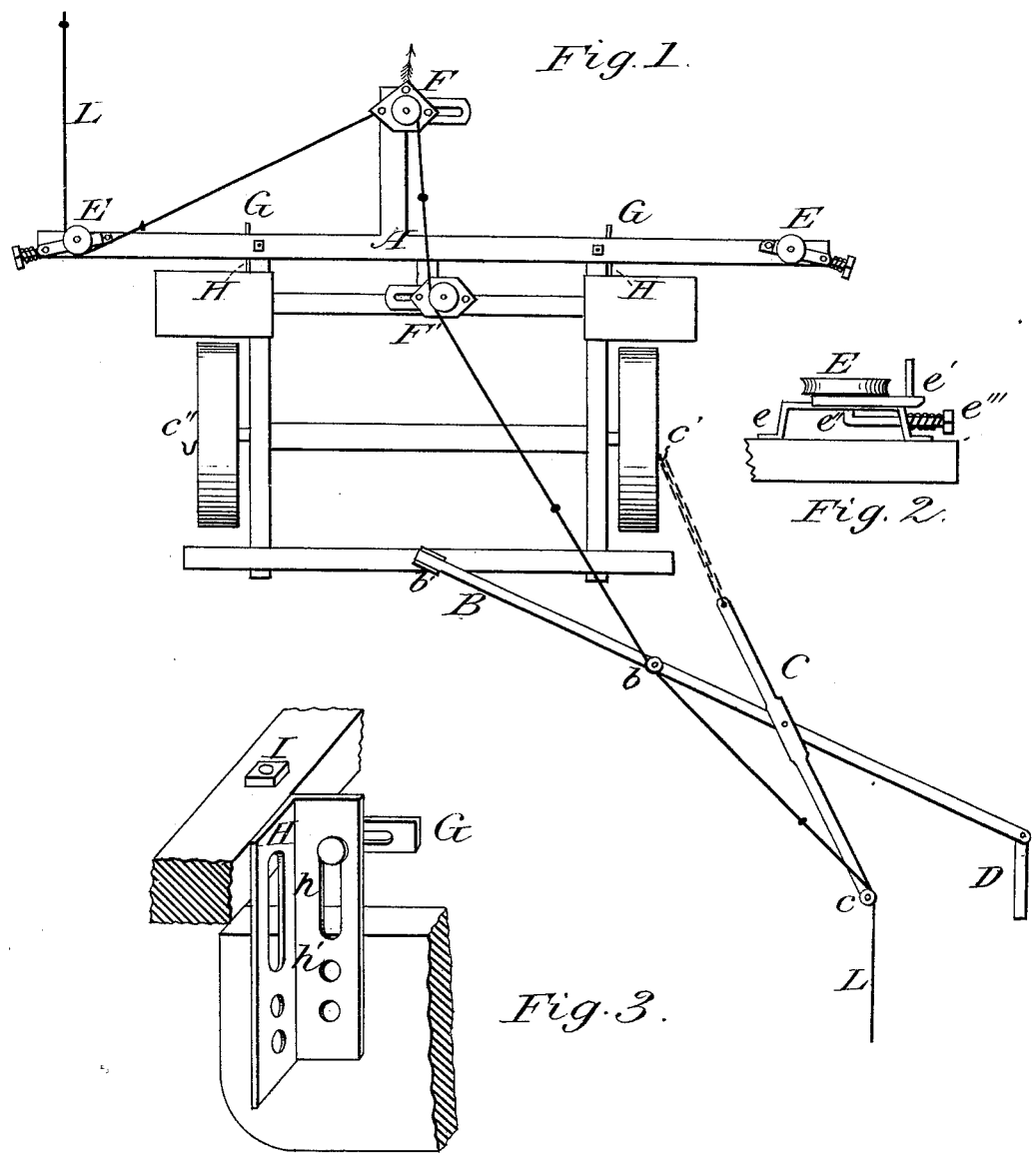

GEORGE W. MURPHEY AND FRANK P. MURPHEY, OF MACON COUNTY, ILL.

IMPROVEMENT IN CORN-PLANTERS.

Specification forming part of Letters Patent No. 222,197, dated December 2, 1879; application filed February 11, 1878.

*To all whom it may concern:*

Be it known that we, GEORGE W. MURPHEY and FRANK P. MURPHEY, of the county of Macon and State of Illinois, have invented new and useful Improvements in Corn-Planters, of which the following is a specification.

Our invention relates to corn-planters operated by a check-row cord; and it consists in a device for imparting a reciprocating motion to the seed-valves, a device for regulating the tension of the cord, a device for attaching the check-row bar to different planters, and a marker, constructed in such a manner that the cord is carried over without crossing the planter, all of which will be hereinafter specified in detail, reference being had to the accompanying drawings, in which—

Figure 1 is a plan, showing position and arrangement of check-row bar and marking device and direction of cord in being "laid over." Fig. 2 is the device for regulating the tension of cord. Fig. 3 is the device for attaching the check-row bar to the planter.

A represents the check-row bar constructed, as shown, with an arm projecting in front, to which the reciprocating device is secured.

B, C, and D, with chain connected with axle at c, represent the marker and apparatus for laying over the cord.

E E show pulleys on tension device, in which e e' e'' e''', in Fig. 2, specify parts.

F F' show pulleys on slotted supports, arranged to work in said slots to accommodate the position of the check-row cord as it is fed in from either side of the planter alternately.

G shows a slotted bar working in conjunction with plate H to form the connection between check-row bar and planter, said plate H being formed substantially as shown, and provided with slots h and holes h'. Bolt I also forms a part of before-mentioned connection, and is hook-shaped at its lower extremity to engage slot in bar G. L is the check-row cord.

In operating our machine the check-row cord is anchored, and passed around pulleys E, F, F', b, and c. After crossing the field the chain on the marking device is loosened from hook c' and transferred to the opposite side, the cord laid across from the other direction, and the planting continued.

We claim as new and of our invention—

1. The combination of support e, bar e'' with its spring, nut e''', and pulley E, constructed and arranged to operate as a tension for a check-row cord, substantially as set forth.

2. Bars B and C, marker D, and pulleys b and c, in combination with a check-row cord, when connected with the axle of a corn-planter by flexible means, as shown, and adapted for use on either side alternately, substantially as set forth.

3. Plate H, bolt I, and slotted bar G, in combination, forming an adjustable attachment for the check-row bar, substantially as herein specified.

GEO. W. MURPHEY.
FRANK P. MURPHEY.

Attest:
D. J. BLACK,
LEVI P. GRAHAM.